(12) United States Patent
Horner

(10) Patent No.: US 6,936,765 B2
(45) Date of Patent: Aug. 30, 2005

(54) GUIDE FOR INSTALLING ELECTRICAL WIRING

(76) Inventor: Jay Horner, 117 Lakeshore Rd., E., Suite 185, Port Credit (CA), L5H 2H6

(*) Notice: Subject to any disclaimer, the term of this patent is extended or adjusted under 35 U.S.C. 154(b) by 0 days.

(21) Appl. No.: 10/292,810

(22) Filed: Nov. 13, 2002

(65) Prior Publication Data

US 2003/0112586 A1 Jun. 19, 2003

Related U.S. Application Data

(60) Provisional application No. 60/331,304, filed on Nov. 14, 2001.

(51) Int. Cl.[7] ............................................... H02G 3/10
(52) U.S. Cl. .................. 174/48; 174/53; 174/65 R; 174/78; 174/50; 174/51; 174/52.1; 174/54; 174/58; 174/59; 174/60; 174/61; 220/3.3; 220/3.4; 220/3.5; 220/5; 52/220.5; 52/220.7; 52/220.8; 439/535; 439/536
(58) Field of Search ............................... 174/53, 65 R, 174/78, 50, 51, 52.1, 54, 58, 59, 60, 61, 48; 220/3.3, 3.4, 3.5, 5; 52/220.5, 220.7, 220.8; 439/535, 536

(56) References Cited

U.S. PATENT DOCUMENTS 3,784,730 A * 1/1974 Bannies .................... 174/75 C
5,621,191 A * 4/1997 Norris et al. ........... 174/65 SS
6,018,126 A * 1/2000 Castellani et al. ............ 174/48

* cited by examiner

Primary Examiner—Anthony Dinkins
Assistant Examiner—Anton Harris
(74) Attorney, Agent, or Firm—Shoemaker and Mattare

(57) ABSTRACT

An insert bridges a junction box to provide a continuous path between consecutive pipes of an electrical wiring guideway. The insert includes a generally tubular body having a first end and a second end. The insert has a length that is sized to bridge a gap across the junction box and a diameter that is sized for sliding into a pipe of the electrical wiring guideway. A first flange surrounds the generally tubular body and is spaced from the first end thereof. A second flange surrounds the generally tubular body and is spaced from the second end thereof. The flanges abut opposing inner walls of the junction box to ensure that the insert is not lost into a pipe. A slit extends along the length of the insert to allow for removal of the insert once the electrical wiring has been laid.

27 Claims, 8 Drawing Sheets

GUIDE FOR INSTALLING ELECTRICAL WIRING

This application claims benefit of provisional application Ser. No. 60/331,304 filed Nov. 14, 2001.

FIELD OF THE INVENTION

This invention relates to the art of installing an electrical service in a building, either as an original installation or as a retrofit and more specifically, to an insert for a junction and a junction box incorporating the same.

BACKGROUND OF THE INVENTION

It is common in electrical service industry, when wishing to install an electrical system, to put into place a plurality of junction boxes, along with sections of hollow pipe stretching between adjacent pairs of the junction boxes, and defining essentially a tubular guideway to protect the required electrical wiring.

In order to install electrical wiring, a first operation is carried out in which a "fish tape" is fed through the electrical system (the above-mentioned tubular guideway) starting at or adjacent a main electrical panel at one end of the guideway, and extending to the other end of the guideway. Once the leading end of the fish tape has appeared at the distal end of the guideway (i.e. distal with respect to the main electrical panel), it is tied around or connected to the leading end of one or more electrical wires. Then, the fish tape is pulled back in the reversed direction, out of the guideway, simultaneously dragging the wire(s) through the guideway.

One major problem is that the fish tape, while it is being fed through the guideway, can get caught at one or more of the junction boxes. In view of this, it is standard practice to have an extra employee who moves from junction box to junction box, so that he has access to each junction box as the leading end of the fish tape enters it. The employee at the junction box ensures that the leading end of the fish tape enters the next hollow pipe section so that it can continue on to the next junction box.

In view of the above, it is an object of the present invention to provide an insert that facilitates the installation of wiring through a tubular guideway.

SUMMARY OF THE INVENTION

According to an aspect of the present invention there is provided an insert for a junction box, the insert comprising:

a generally tubular body having a first end and a second end, the generally tubular body having a length that is sized to bridge a gap across the junction box and a diameter that is sized for sliding into a pipe of an electrical wiring guideway;

a first flange and a second flange surrounding said generally tubular body, said first flange being spaced from said first end of said generally tubular body and said second flange being spaced from said second end of said generally tubular body, said first flange and said second flange for abutting opposing inner walls of said junction box; and a slit extending along the length of the insert;

wherein the insert bridges the junction box to provide a continuous path between pipes of the electrical wiring guideway.

According to another aspect of the present invention there is provided an insert for a junction box that is part of an electrical wiring guideway, the insert comprising:

a generally tubular body having a first end and a second end, the insert having a length sufficient for bridging a gap across the junction box and a diameter sized for being received inside pipes extending from opposite sides of the junction box to provide a continuous path between the pipes;

a first flange surrounding the generally tubular body, the first flange being spaced from the first end of the generally tubular body;

a second flange surrounding the generally tubular body, the second flange being spaced from the second end of the generally tubular body; and a slit extending along the length of the insert.

According to still another aspect of the present invention there is provided an insert comprising:

a generally tubular body having a first end and a second end, the generally tubular body having a length that is sized to bridge a gap across a manhole and a diameter that is sized for sliding into a pipe of an electrical wiring guideway;

a first flange surrounding the generally tubular body, the first flange being spaced from the first end of the generally tubular body, the first flange for abutting a pipe opening;

at least one depressible latch projecting from an outer surface of the generally tubular body, the at least one depressible latch being located adjacent the second end of the generally tubular body; and a slit extending along the length of the insert;

wherein the insert bridges the manhole to provide a continuous path between pipes of the electrical wiring guideway.

According to another aspect of the present invention there is provided an insert comprising:

a generally tubular body having a first portion and a second portion, the second portion being received inside the first portion, a length of the generally tubular body being adjustable to bridge a gap across a junction box and a diameter that is sized for sliding into a pipe of an electrical wiring guideway;

a first flange and a second flange surrounding the generally tubular body, the first flange being spaced from a first end of the generally tubular body and the second flange being spaced from a second end of the generally tubular body, the first flange and the second flange for abutting opposing inner walls of the junction box; and a slit extending along the length of the insert;

wherein the insert bridges the junction box to provide a continuous path between pipes of the electrical wiring guideway.

The present invention provides advantages in that the insert fits easily into a typical junction box and establishes a guided path along which a leading edge of the fish tape can pass without getting snagged or stuck in any given junction box.

BRIEF DESCRIPTION OF THE DRAWINGS

Several embodiments of this invention are illustrated in the accompanying drawings, in which like numerals denote like parts throughout the several views, and in which.

DETAILED DESCRIPTION OF THE PREFERRED EMBODIMENTS

Figure 1:
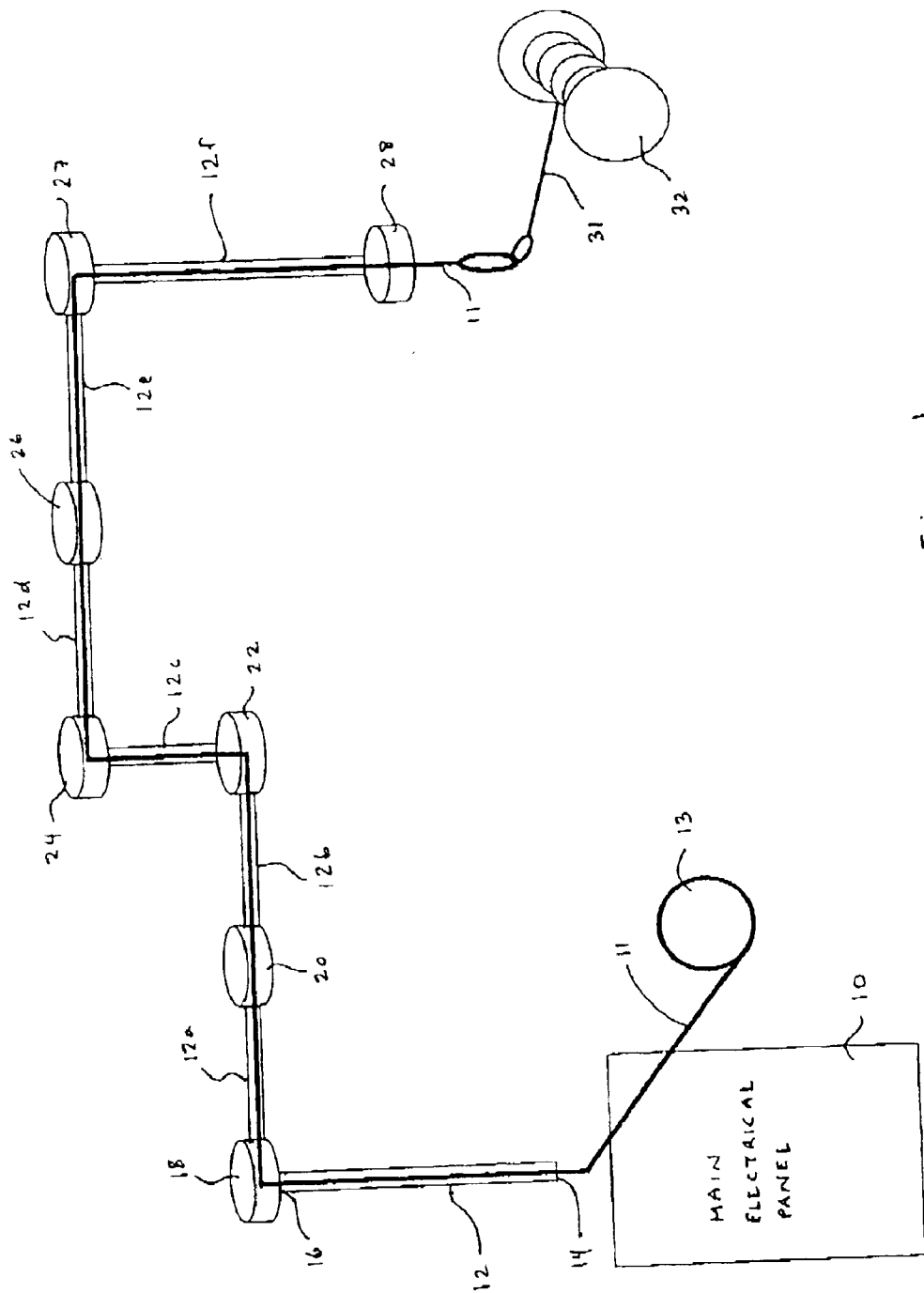
FIG. 1 is a schematic view of a an electrical system in accordance with the prior art.

FIG. 1 illustrates an electrical system including a main electrical panel 10, representing a standard panel of the kind utilized in residential and office buildings.

A first section of pipe 12 has an open end 14 adjacent the main electrical panel and a further end 16 opening into the interior of a first junction box 18. From the junction box 18, a further section of pipe 12a leads to a second junction box 20. As can be readily seen in FIG. 1. further sections of pipe 12b, 12c, 12d, 12e and 12f sequentially connect junction boxes 22, 24, 26, 27 and 28, defining the aforesaid tubular guideway. During wiring of the electrical system, a fish tape 11 is pulled from a fish tape spool 13 adjacent the main electrical panel 10 through the guideway and attached to one end 30 of one or more spools of wire, identified in FIG. 1 by the numeral 32. A person standing adjacent the end of the fish tape 11 (near the main electrical panel 10) can pull the fish tape out of the tubular guideway in the direction opposite the "infeed" direction. This will automatically pull the wire 31 into and through the various pipe sections and junction boxes, eventually making it available adjacent the main electrical panel 10, where it can be hooked up as desired.

Figure 2:
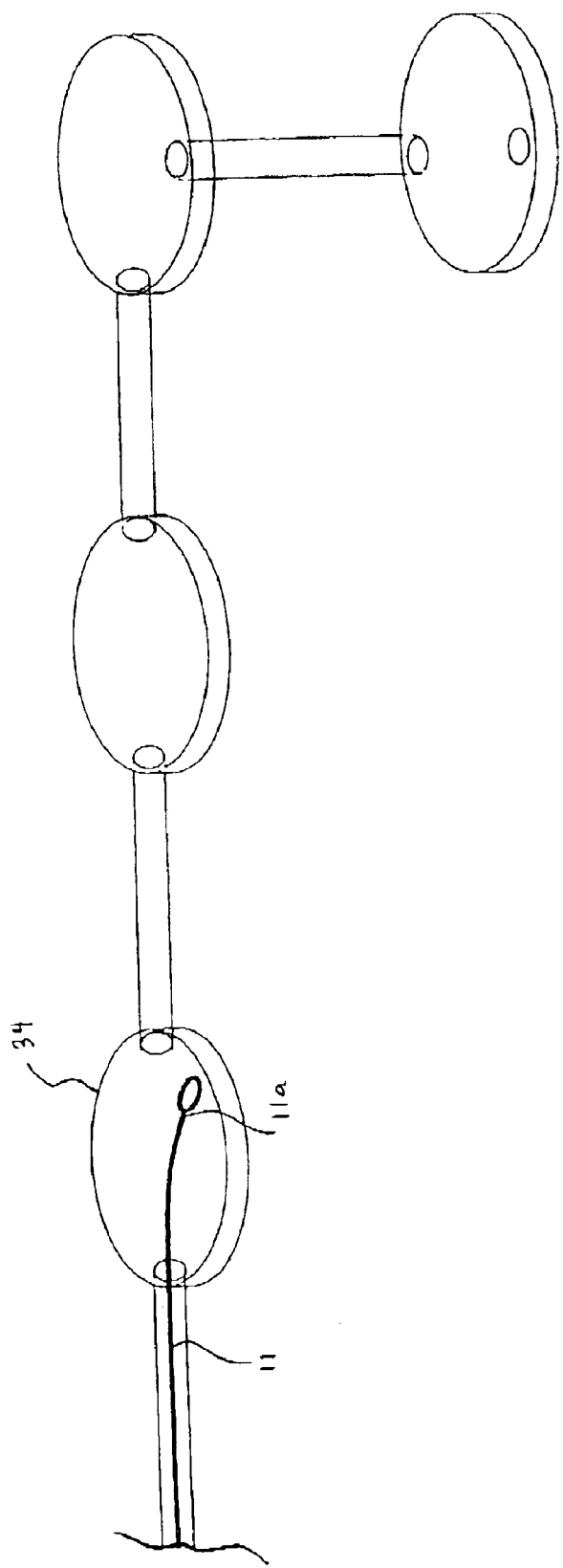
FIG. 2 is a view of a portion of the electrical system of FIG. 1, illustrating the problem that arises in the prior art.

Attention is now directed to FIG. 2, which illustrates what can happen to a the fish tape 11 when entering a junction box such as that marked 34. Note that the fish tape 11 has entered the junction box 34 at a slight angle (due to its own weight or due to an inherent "springiness" in the fish tape). Whatever the cause, the condition shown in FIG. 2 often arises, namely that the leading end 11a does not automatically "find" the outlet opening of the junction box, here illustrated at the numeral 36.

Figure 3:
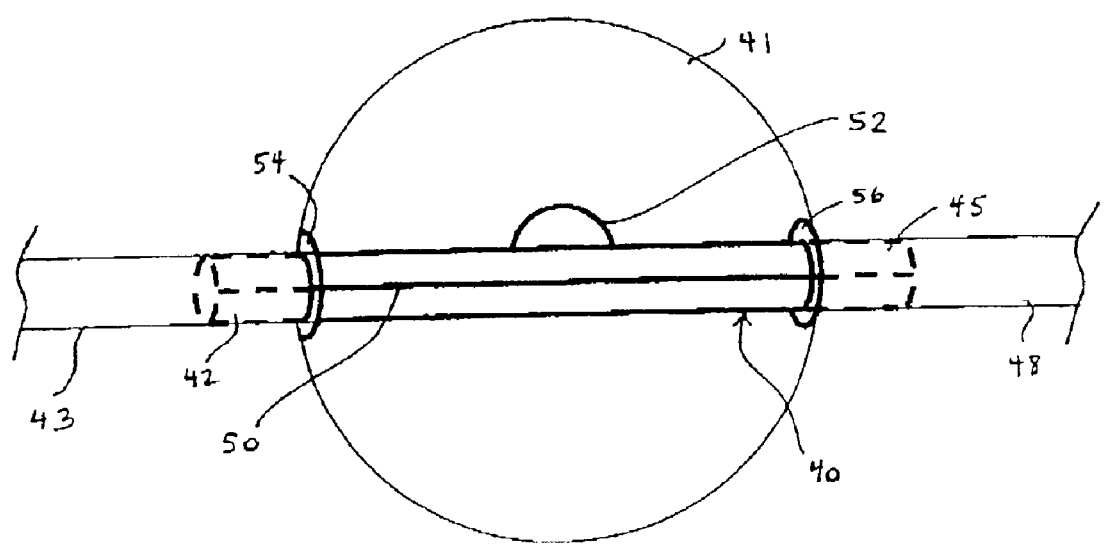
FIG. 3 is a plan view of an embodiment of the present invention.

Attention is now directed to FIG. 3, which illustrates one embodiment of this invention. In FIG. 3, a tubular insert 40 is provided, having a first end 42 adapted to enter the interior of a first pipe section 43 communicating with a junction box 41, and an opposite end 45 adapted to enter a second pipe section 48 communicating with the junction box 41. The tubular insert 40 has a longitudinal slit 50 and a central grip tab 52, useful for removing the tubular insert 40. The longitudinal slit 50 is provided so that the insert 40 may be removed after the wires have been fed through the junction box 41. Two annular flanges 54 and 56 are located adjacent the first and opposite ends 42 and 45. The annular flanges 54 and 56 serve the purpose of preventing the tubular insert 40 from becoming lost down one of the pipe sections 43, 48. As the tubular insert 40 bridges the inlet and outlet locations of the junction box 41, a confined guided path is provided for a fish tape when fed into and pushed through the junction box 41.

Figure 4:
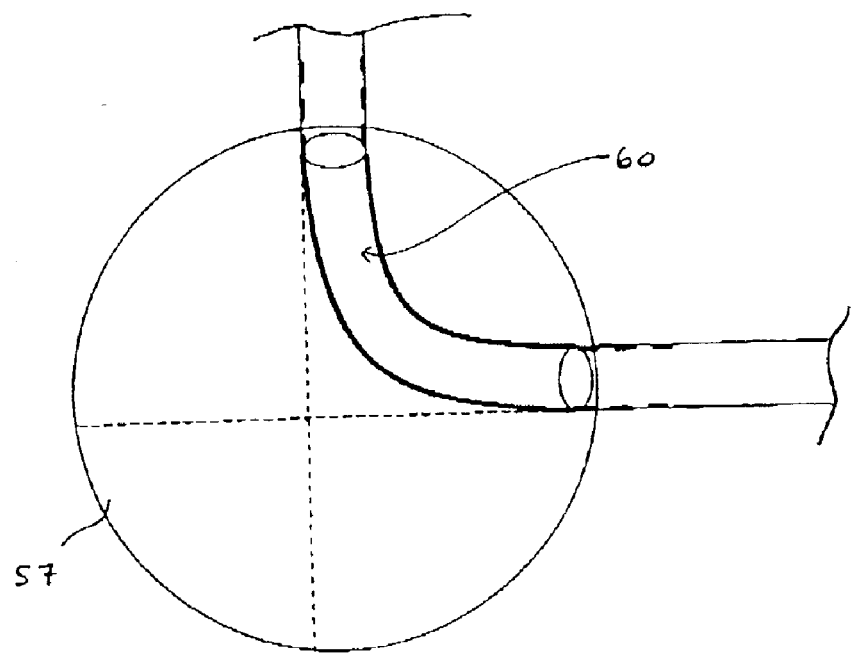
FIG. 4 is a plan view of another embodiment of the present invention.

FIG. 4 shows a different selection for the inlet and outlet locations in a junction box 57, namely locations that are at right angles with respect to each other. Also drawn in FIG. 4 is a tubular insert 60 that is generally elbow shaped, which provides a smooth, rounded inner surface ensuring that the fish tape reaches the required outlet pipe section, without becoming jammed.

Figure 5:
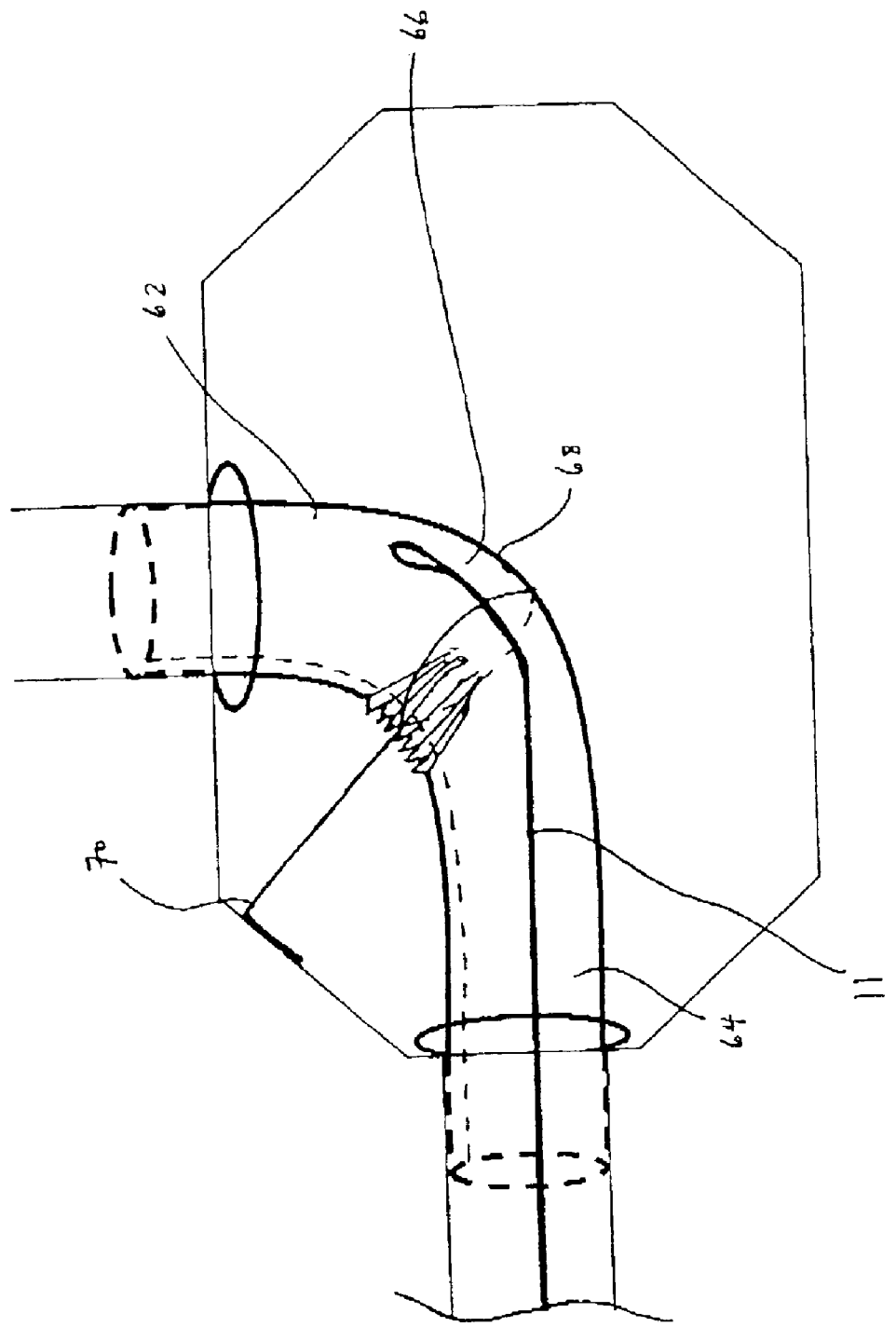
FIG. 5 is a perspective view of still another embodiment of the invention.

The embodiment illustrated in FIG. 5 is preferably a formed unit (as by injection molding, etc.) which has two arms 62 and 64 at generally right angles, joined at a vertex 66 which defines a smoothly curved wall 68 on the inside, the effect of which is to allow the end of the fish tape 11 to pass around to the in the junction box.

In FIG. 5, a plastic bracket 70 is provided to hold the insert in place within the junction box.

Figure 6:
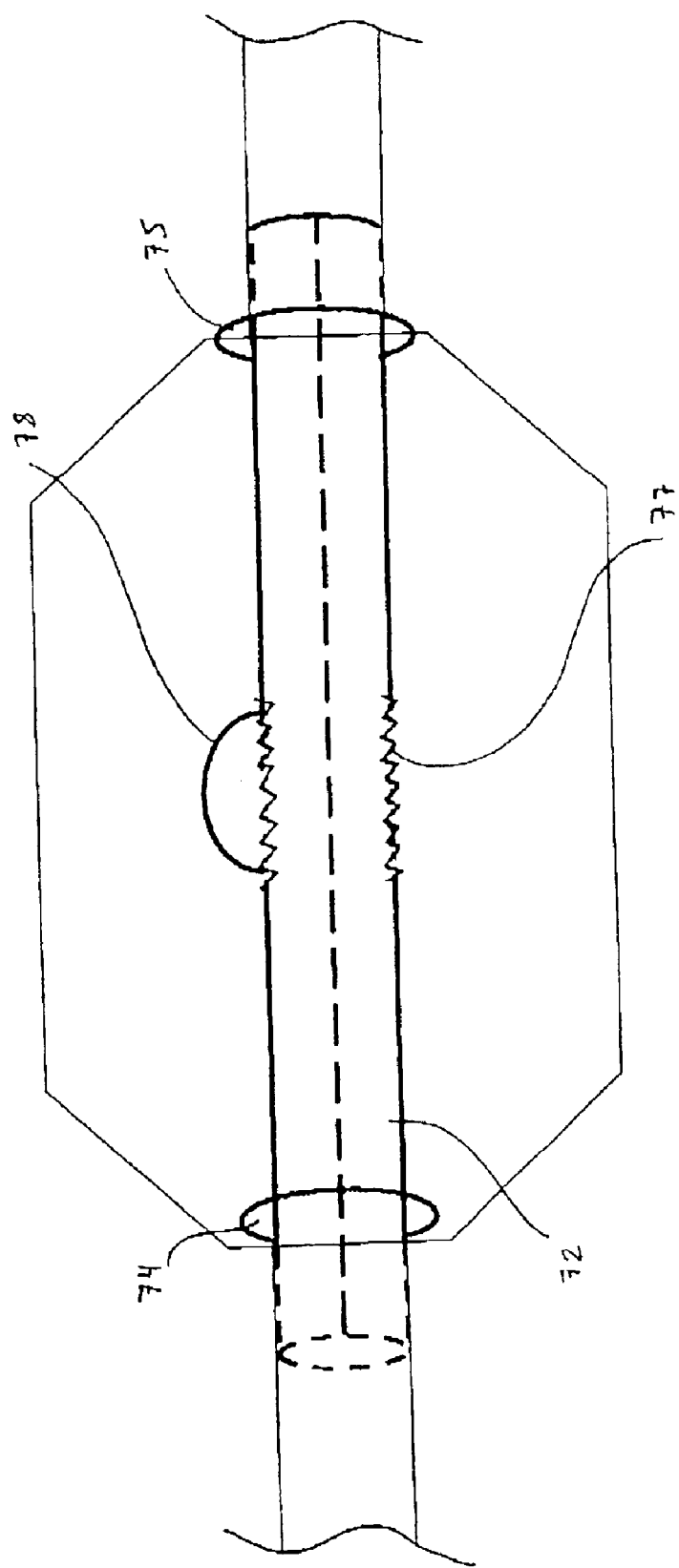
FIG. 6 is a perspective view of yet another embodiment of the present invention.

The embodiment shown in FIG. 6 includes an elongate tubular portion 72 having integral collars 74, 75 to prevent loss of the insert along one of the pipe sections connected to the junction box, and an accordionated central region 77 allowing the insert to flex about the central region. The insert also includes a pull tab 78 adjacent the central region for easy removal of the insert once the fish tape has been inserted and pushed through the junction box.

Figure 7:
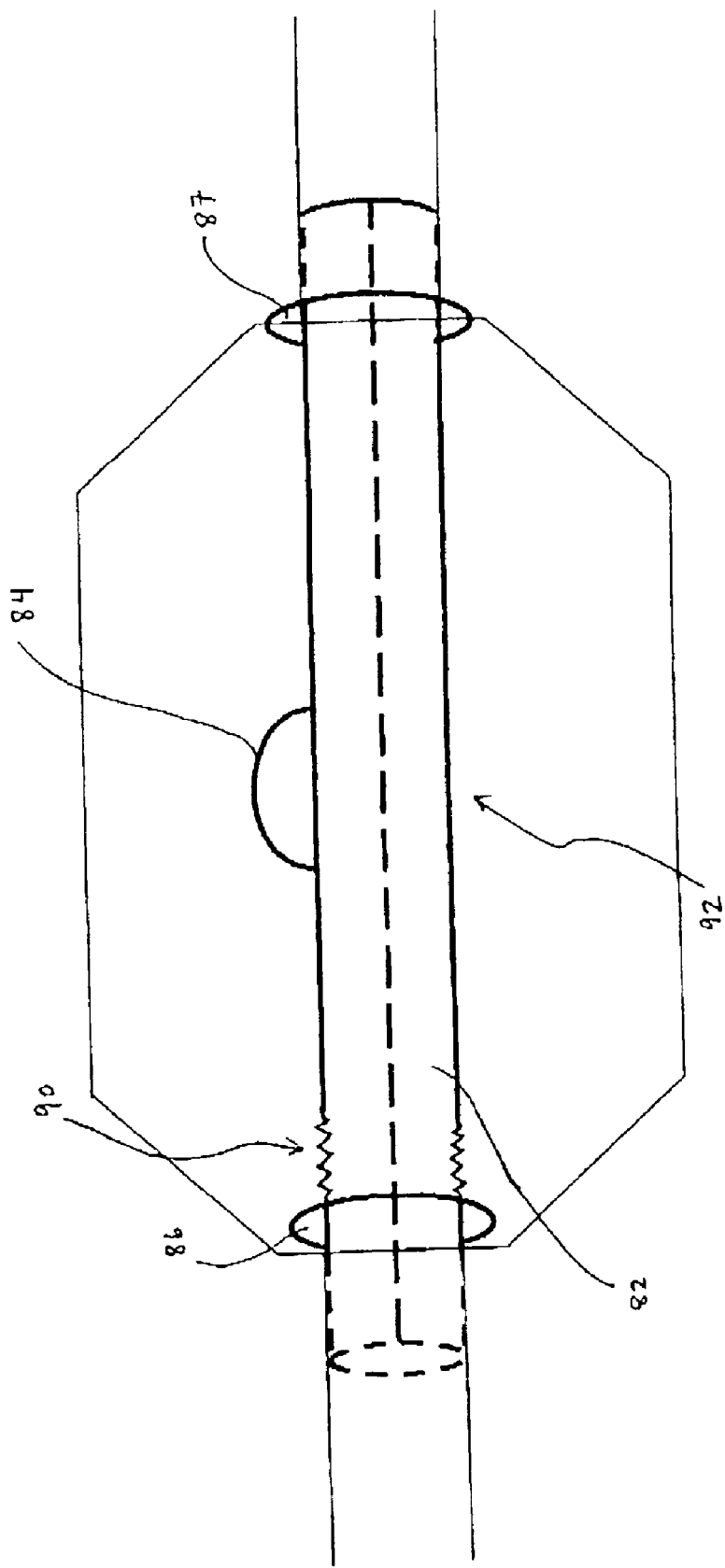
FIG. 7 is a perspective view of another embodiment of the present invention.

In FIG. 7 is shown an embodiment having an elongated tubular portion 82, a central pull tab 84, annular flanges 86, 87, and an optional flex location 90 adjacent one end.

A further option is to provide an extendable and retractable twist lock adjacent the central region. The cut on the twist lock section lines up with a cut on the rest of the insert when "unlocked" for removal. Preferably, the ends flare out slightly, to ensure a tight fit inside the conduit.

The inserts can be made available in different sizes to accommodate all conduit and junction box sizes. For example, a single insert may work well with ½" or ¾" conduit, while the next size up would work with 1" and 1¼" conduit.

Figure 8:
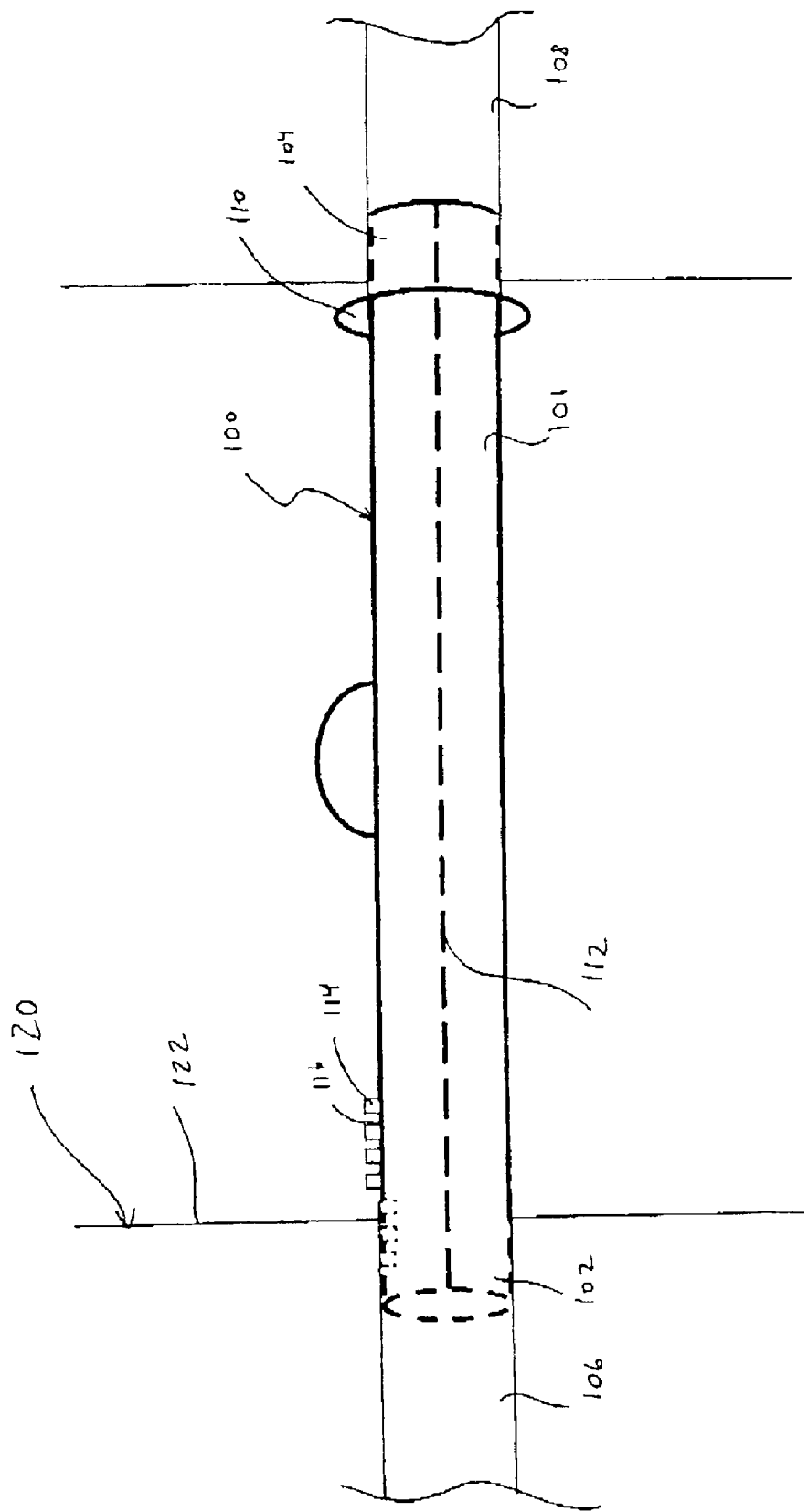
FIG. 8 is a side view of yet another embodiment of the present invention.

Referring to FIG. 8, an insert 100 for use in a manhole 120 is shown. The insert 100 includes a generally tubular body 101, a first end 102 that is received in a first pipe 106 and a second end 104 that is received in a second pipe 108. A flange 110 is located adjacent the second end 104 to abut an inner wall 122 of the manhole 120. The flange 110 ensures that the insert is not lost into the second pipe 108. A slit 112 extends along the length of the insert 100 for allowing removal once the wiring has been fed between the first pipe 106 and the second pipe 108. A series of depressible latches 114 project through holes 116 provided in an outer surface of the generally tubular body 101. Springs (not shown) bias the latches 114 so that they extend outwardly from the outer surface of the insert 100.

The insert 100 may be used for facilitating all types of underground wiring, such as fibre optics, for example.

In use, the first end 102 of the insert 100 is fed into the first pipe 106 by depressing the depressible latches 114. Once a sufficient length of the insert 100 has been fed into the first pipe 106 and the insert 100 has cleared the second pipe 108, the insert 100 is retracted from the first pipe 102 and fed into the second pipe 108. The insert 100 is fed into the second pipe 108 until the flange 110 abuts a pipe opening of the second pipe 108. The latches 114 that are not depressed inside the first pipe 106 serve to maintain the insert 100 in a proper position so by abutting a pipe opening of the first pipe 106. Thus, the insert 100 is located between the first and second pipes 106, 108 in preparation for receiving the fish tape (not shown).

It will be appreciated that an insert 100 of the type shown in FIG. 8 may also be used in a junction box of an in-house application. The insert 100 would have to be sized to fit the smaller application.

Figure 9:
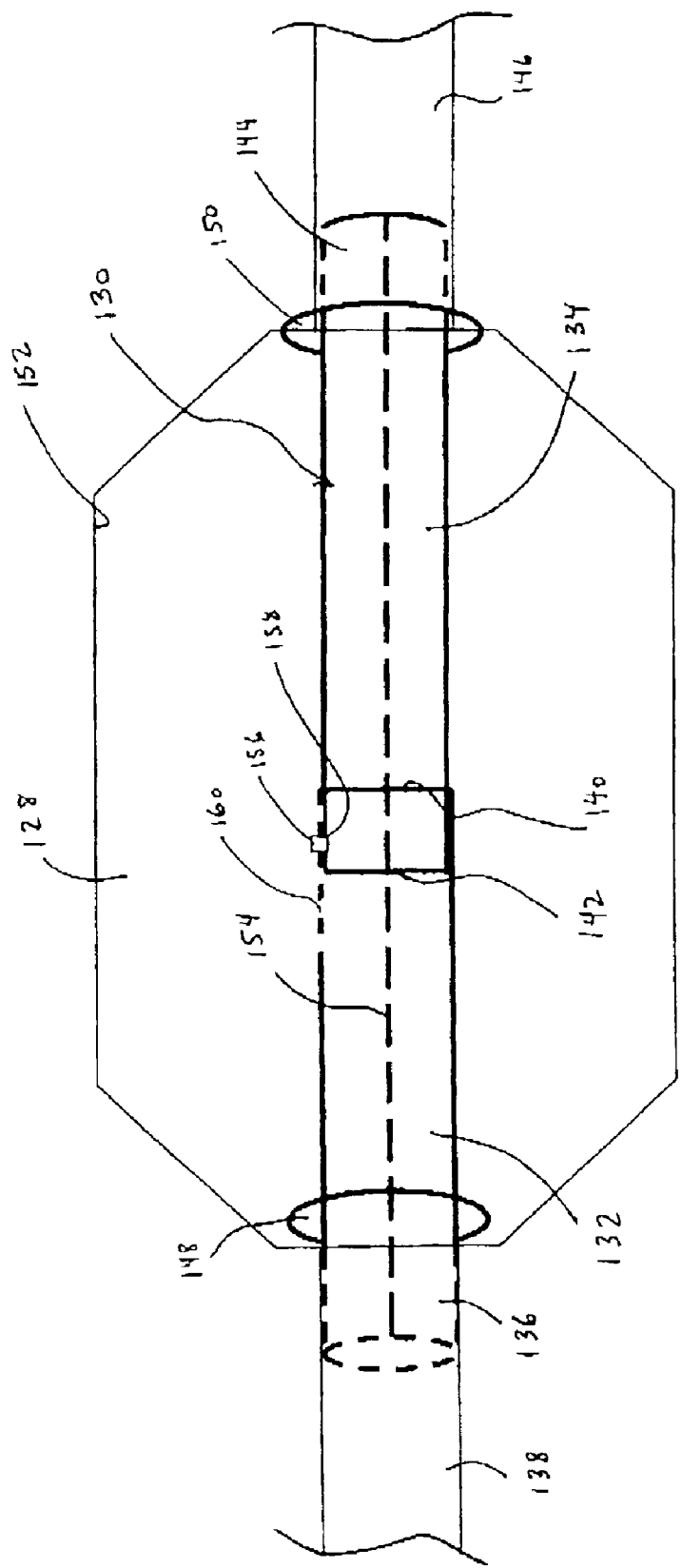
FIG. 9 is a side view of another embodiment of the present invention.

Referring to FIG. 9, an insert 130 for bridging a junction box 128 is shown. The insert 130 includes a first portion 132 and a second portion 134. The first and second portions 132,134 are generally tubular in shape. The first portion 132 includes a first end 136 that is received in a first pipe 138 and a second end 140 that mates with a first end 142 of the second portion 134. A second end 144 of the second portion 134 is received in a second pipe 146. As shown, the second portion 134 has a slightly smaller diameter than the first portion 132 to allow the second portion 134 to slide into the first portion 132.

A first flange 148 is located adjacent the first end 136 of the first portion 132 and a second flange 150 is located adjacent the second end 144 of the second portion 134. The flanges 148, 150 abut an inner wall 152 of the junction box 128 and ensure that the insert 130 is not lost into either of the pipes 138, 146. A slit 154 extends along the length of the insert 130 to allow for removal thereof once the wiring has been fed between the first pipe 138 and the second pipe 146.

A depressible latch 156 projects through an aperture 158 provided in an outer surface of the second portion 134. A spring (not shown) biases the latch 156 outwardly so that it may be received in one of the apertures 160 provided in the first portion 132 of the insert 130. This allows the length of the insert 130 to be adjusted.

The inserts are typically comprised of plastic, however, may also be comprised of a metal, such as aluminum.

In view of the foregoing, it will be seen that there has been provided inexpensive and re-useable tear-away plastic inserts for location in each junction box at the time the box is mounted along with the pipe sections. The insert is designed to allow a fish tape to pass through junction boxes without the need for a second worker to feed the fish tape through each junction box, especially when the junction boxes are mounted on high ceilings. Embodiments have been described which allow the fish tape to pass through straight runs, 90° turns or other angulations (for example 45°). The inserts are simply removed at a later point when fixtures are installed, or when the junction boxes are closed by attaching the standard covers.

While several embodiments of this invention have been illustrated in the accompanying drawings and described hereinabove, it will be evident to those skilled in the art that changes and modifications may be made therein without departing from the essence of this invention.

What is claimed is:

1. A flexible insert for a junction box that is part of an electrical wiring guideway, said insert comprising:
    a generally tubular body having a first end and a second end, said insert having a length sized to bridge a gap within said junction box between inlet and outlet locations of said junction box to provide a generally continuous confined path through said junction box;
    a first flange surrounding said generally tubular body, said first flange being adjacent but spaced from said first end of said generally tubular body;
    a second flange surrounding said generally tubular body, said second flange being adjacent but spaced from said second end of said generally tubular body; and
    a slit extending along the length of said insert to permit tearing away of said insert and facilitate removal of said insert from said junction box after wiring of said guideway.

2. An insert as claimed in claim 1, wherein said tubular body includes a variable length portion for adjusting the length of said insert.

3. An insert as claimed in claim 2, wherein said variable length portion has an accordion-like profile.

4. An insert as claimed in claim 2, wherein said variable length portion is an extendable and retractable twist lock.

5. An insert as claimed in claim 1, further comprising a grip tab coupled to said generally tubular body for facilitating removal of the insert.

6. An insert as claimed in claim 1, wherein said first end of said generally tubular body is disposed at an angle with respect to said second end.

7. An insert as claimed in claim 6, wherein said generally tubular body is generally elbow shaped.

8. An insert as claimed in claim 1, wherein said first flange and said second flange are integral with said generally tubular body.

9. An insert as claimed in claim 1, wherein said generally tubular body is generally linear.

10. An insert for a junction box comprising:
    a generally tubular body formed of flexible material, said tubular body being sized to be positioned within and extend between an inlet and an outlet of said junction box and provide a confined path through said junction box between pipe sections coupled to said inlet and outlet; and
    a formation extending generally along the length of said tubular body to facilitate removal of said insert from within said junction box when said insert surrounds wiring extending through said junction box between said pipe sections.

11. An insert according to claim 10 wherein said insert is formed of plastic.

12. An insert according to claim 11 wherein said formation is a longitudinal slit.

13. An insert according to claim 12 wherein said insert is straight.

14. An insert according to claim 12 wherein said insert is curved.

15. A junction box comprising:
    a housing having a wiring inlet and a wiring outlet; and
    a flexible insert removably accommodated within said housing, said insert including a generally tubular body sized to bridge said inlet and outlet and define a confined path through said junction box between pipe sections coupled to said inlet and outlet.

16. A junction box according to claim 15 wherein said insert is removable from said junction box by tearing when wiring extends through said tubular body between said inlet and outlet.

17. A junction box according to claim 16 wherein said insert is formed of plastic.

18. A junction box according to claim 17 wherein said tubular body includes a slit formed therein and extending generally along the length thereof, said slit facilitating tearing of said insert.

19. An insert according to claim 18 wherein said insert is straight.

20. An insert according to claim 18 wherein said insert is curved.

21. A junction box according to claim 18 wherein said insert has at least one tab thereon.

22. An insert for a junction defining an open area disposed between pipe sections through which electrical wiring is to be run, said insert comprising:
    a generally tubular body formed of flexible material sized to be accommodated by said junction and to extend across said junction and between said pipe sections thereby to provide a confined path through said junction between said pipe sections; and a longitudinal tearing formation extending generally along the length of said tubular body to facilitate removal of said insert from said junction after wiring has been drawn through said junction that extends between said pipe sections.

23. An insert according to claim 22 wherein said junction is a manhole and wherein said insert further comprises retainers to inhibit said tubular body from being lost in said pipe sections.

24. An insert according to claim 22 wherein said junction is a junction box and wherein said insert further comprises retainers to inhibit said tubular body from being lost in said pipe sections.

25. An insert according to claim 23 wherein said insert is straight.

26. An insert according to claim 24 wherein said insert is straight.

27. An insert according to claim 24 wherein said insert is curved.

* * * * *